(12) United States Patent
Masuzawa et al.

(10) Patent No.: US 7,871,210 B2
(45) Date of Patent: Jan. 18, 2011

(54) IMAGING DEVICE WITH ALIGNMENT MEANS FOR ALIGNING SHUTTER UNIT AND IMAGING UNIT

(75) Inventors: Koichi Masuzawa, Chiba (JP); Kenichi Kudo, Chiba (JP); Yasutoshi Chiba, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/572,551

(22) Filed: Oct. 2, 2009

(65) Prior Publication Data
US 2010/0014850 A1 Jan. 21, 2010

Related U.S. Application Data

(63) Continuation of application No. PCT/JP2008/069094, filed on Oct. 22, 2008.

(30) Foreign Application Priority Data
Nov. 22, 2007 (JP) .............................. 2007-303766

(51) Int. Cl.
*G03B 17/38* (2006.01)
(52) U.S. Cl. ........................ 396/502; 396/469; 396/493; 348/374
(58) Field of Classification Search ........................ None
See application file for complete search history.

(56) References Cited

U.S. PATENT DOCUMENTS

| | | | |
|---|---|---|---|
| 5,654,837 A * | 8/1997 | Tanaka | 359/825 |
| 7,114,862 B2 * | 10/2006 | Huang | 396/452 |
| 7,605,864 B2 * | 10/2009 | Takahashi et al. | 348/374 |
| 2005/0179803 A1 * | 8/2005 | Sawai | 348/335 |

FOREIGN PATENT DOCUMENTS

| | | |
|---|---|---|
| JP | 11-97090 | 4/1999 |
| JP | 2000-112082 | 4/2000 |
| JP | 2006-64769 A1 | 3/2006 |
| JP | 2006-276763 A1 | 10/2006 |

OTHER PUBLICATIONS

International Search Report for International Application No. PCT/JP2008/069094 dated Jan. 8, 2009.

* cited by examiner

*Primary Examiner*—W. B. Perkey
*Assistant Examiner*—Bret Adams
(74) *Attorney, Agent, or Firm*—Kratz, Quintos & Hanson, LLP

(57) ABSTRACT

An imaging device includes: an image pickup unit including an image pickup element and a control substrate mounted with the image pickup element; and a shutter unit including a blade for adjusting an amount of light reaching the image pickup element and a drive source for driving the blade. The shutter unit includes a terminal portion electrically connected to a coil of the drive source. The terminal portion extends outward from the shutter unit and is electrically connected to the control substrate. The terminal portion and the image pickup unit include alignment means for aligning these each other. The shutter unit is aligned with the image pickup unit via the terminal portion.

7 Claims, 10 Drawing Sheets

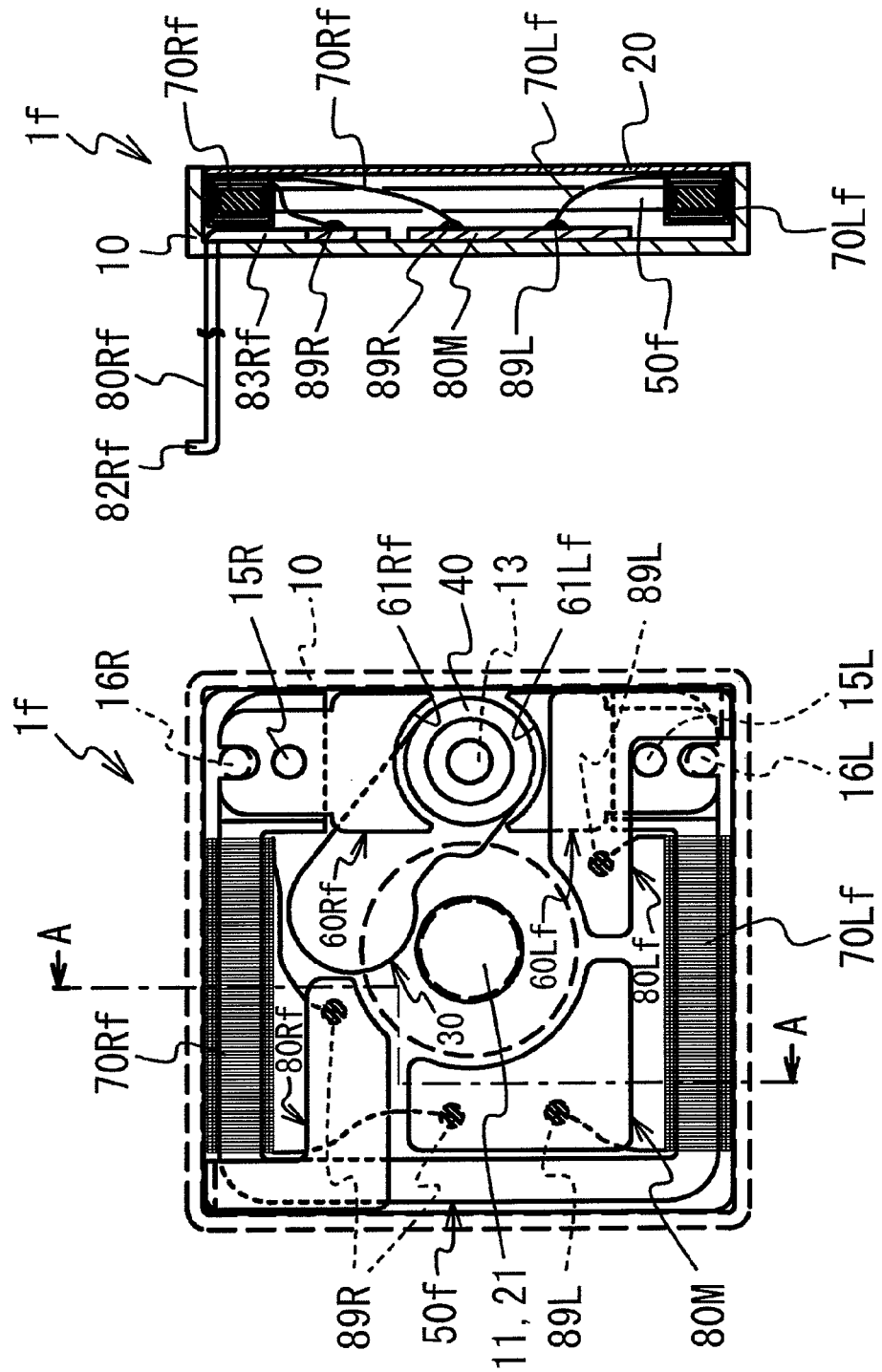

IMAGING DEVICE WITH ALIGNMENT MEANS FOR ALIGNING SHUTTER UNIT AND IMAGING UNIT

CROSS-REFERENCE TO RELATED APPLICATION

This application is a continuation of and claims priority to International Patent Application No. PCT/JP2008/069094 filed on Oct. 22, 2008, which claims priority to Japanese Patent Application No. 2007-303766 filed on Nov. 22, 2007, subject matter of these patent documents is incorporated by reference herein in its entirety.

BACKGROUND OF THE INVENTION

1. Field of the Invention

The present invention relates to imaging devices.

2. Description of the Related Art

Conventionally, there is known an imaging device including: an image pickup unit with an image pickup element; and a shutter unit with a blade for adjusting an amount of light reaching the image pickup element (see Japanese Unexamined Patent Application Publication No. 2006-64769). In such a shutter unit employed in the imaging device, a drive source for driving the blade is installed. Generally, the drive source is supplied with power from its outside, and then drives the blade.

FIG. 10A is an exploded perspective view of a conventional imaging device. The conventional imaging device includes a shutter unit 1x and an image pickup unit 100x. The shutter unit 1x houses a blade (not illustrated) for adjusting an opening degree of an opening 11x formed on an upper surface of a chassis 2x, and an actuator for driving the blade. The actuator includes a rotor, a stator, and a coil for energizing the stator (all of them are not illustrated).

Additionally, the image pickup unit 100x has an image pickup element (not illustrated) and a control substrate 120X with the image pickup element mounted thereon. An opening 110x for causing incident light to reach the image pickup element is formed on the upper surface of a chassis 102x. The shutter unit 1x is provided with the coil and a flexible printed substrate (hereinafter referred to as FPC) 80x electrically connecting the coil of the actuator and the control substrate 120x. The FPC 80x is electrically connected to the coil within the chassis 2x, and extends outward from the chassis 2x.

FIG. 10B is a perspective view of the conventional imaging device after the chassis 2x is assembled to the image pickup unit 100x. As illustrated in FIG. 9B, the shutter unit 1x is fixed on the upper portion of the image pickup unit 100x by a double-faced tape or the like, and then a land portion 81x formed on an end portion of the FPC 80x is extended to a bottom side of the control substrate 120x. Next, the land portion 81x and the control substrate 120x are electrically connected by solder or conductive bonding. Therefore, the control substrate 120x and the coil are electrically connected via the FPC 80x. For example, when an IC, which controls the energization of the coil, or the like is mounted the control substrate 120x, the operation of the IC allows the energized state of the coil to be controlled. Accordingly, the blade installed in the shutter unit 1x can be controlled.

However, if the FPC 80x extended from the shutter unit 1x is employed, it is required for the FPC 80x to be routed to an bottom side of the control substrate 120x, in order to ensure an electrical connection of the FPC 80x and the control substrate 120x by means of solders. Therefore, such a soldering work is a factor that degrades the assembling workability. Further, the image pickup unit 100x and the shutter unit 1x have to be fixed with each other at accurate positions. To achieve this, alignment means has to be provided. The provision of the alignment means causes the whole structure to be complicated.

SUMMARY OF THE INVENTION

It is therefore an object of the present invention to provide an imaging device in which assembling workability is improved and its structure is simplified.

According to an aspect of the present invention, there is provided an imaging device including: an image pickup unit including an image pickup element and a control substrate mounted with the image pickup element; and a shutter unit including a blade for adjusting an amount of light reaching the image pickup element and a drive source for driving the blade; wherein the shutter unit includes a terminal portion electrically connected to a coil of the drive source, the terminal portion extends outward from the shutter unit and is electrically connected to the control substrate, the terminal portion and the image pickup unit include alignment means for aligning these each other, and the shutter unit is aligned with the image pickup unit via the terminal portion.

BRIEF DESCRIPTION OF THE DRAWINGS

Preferred embodiments of the present invention will be described in detail with reference to the following drawings, wherein:

FIG. 9A is a front view of an inner structure of a shutter unit of an imaging device according to a sixth variation, and FIG. 9B is a cross sectional view taken along line A-A of FIG. 9A.

DESCRIPTION OF THE PREFERRED EMBODIMENTS

A description will now be given, with reference to the accompanying drawings, of a first embodiment of the present invention.

First Embodiment

Figure 1:
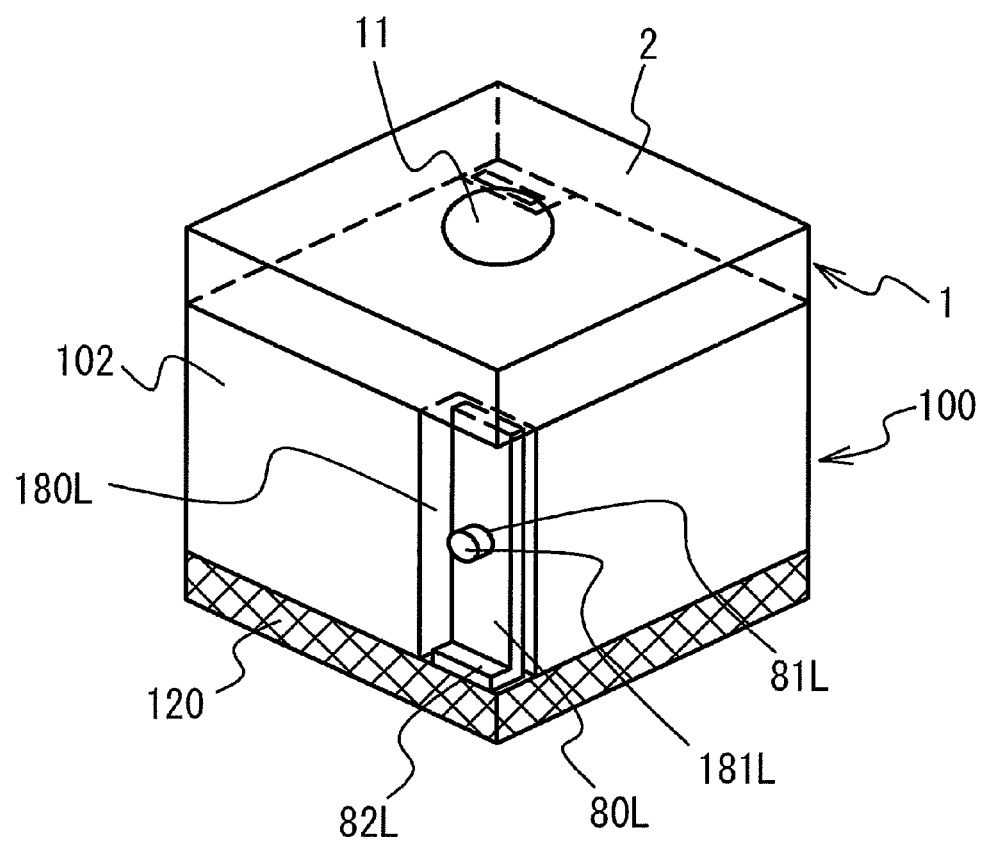
FIG. 1 is a perspective view of an imaging device according to a first embodiment.
Figure 2:
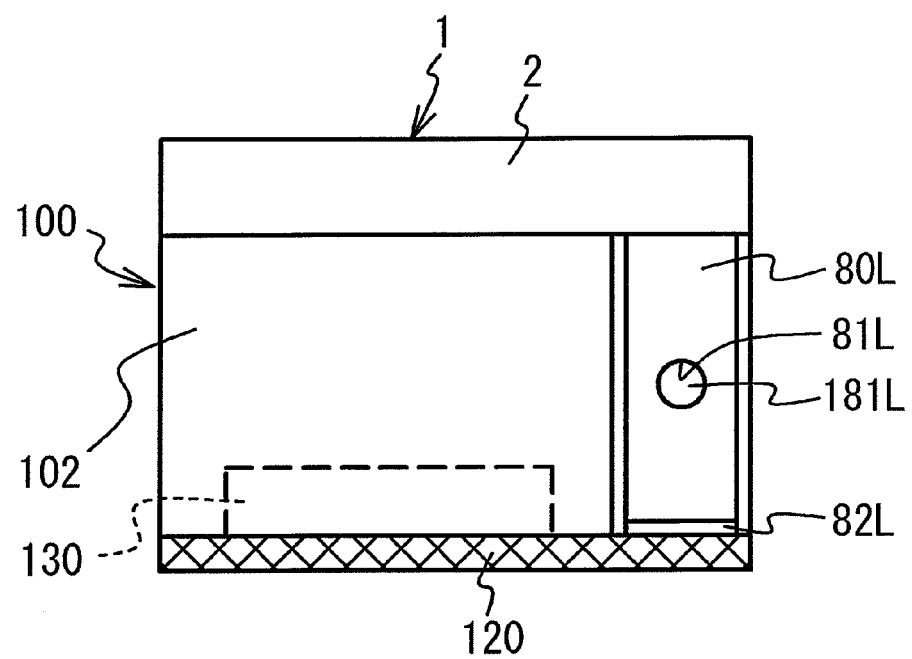
FIG. 2 is a side view of the imaging device.
Figure 3:
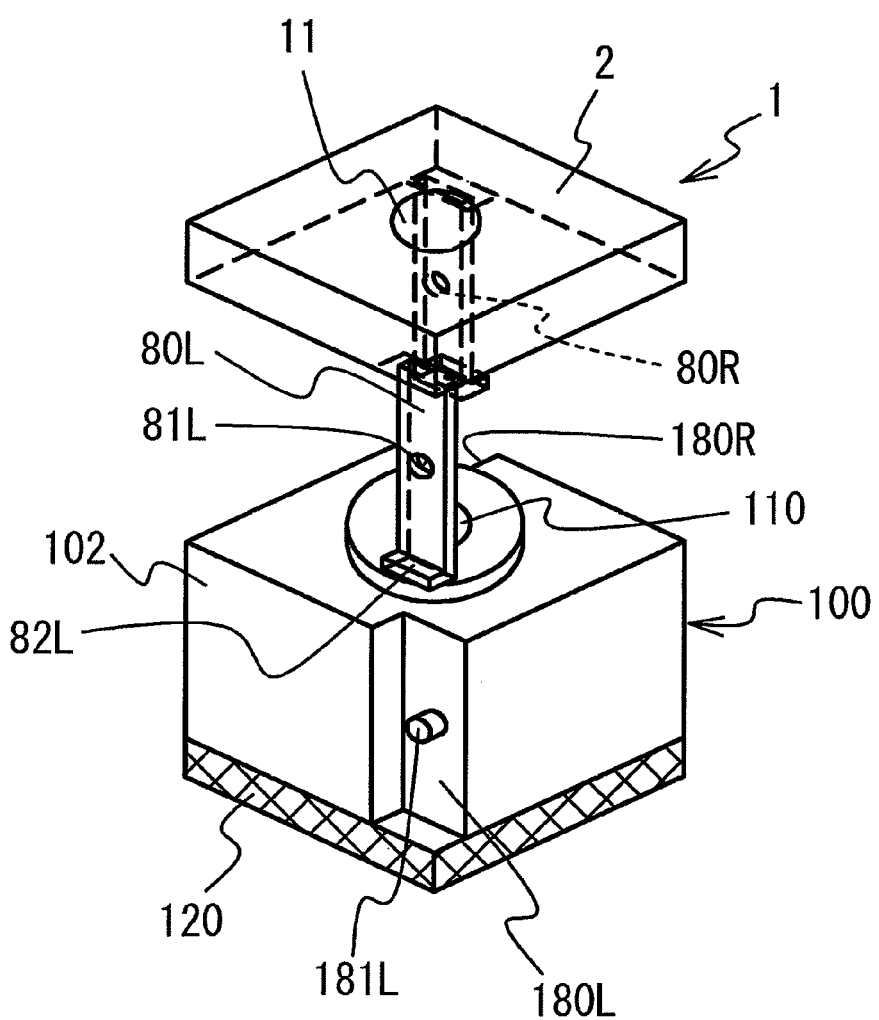
FIG. 3 is a perspective view of the imaging device that is separated into a shutter unit and an image pickup unit.

FIG. 1 is a perspective view of an imaging device according to a first embodiment. FIG. 2 is a side view of the imaging device. FIG. 3 is a perspective view of the imaging device that is separated into a shutter unit 1 and an image pickup unit 100. The shutter unit 1 is equipped with a blade and an actuator serving as a drive source for driving the blade in its inside, as will be described later in detail. Additionally, the shutter unit 1 has an opening 11, so that the blade adjust the opening degree of the opening 11, as illustrated in FIGS. 1 to 3. A chassis 2 of the shutter unit 1 has a given thickness and a rectangular shape.

The image pickup unit 100 is equipped with a control substrate 120, an image pickup element 130 mounted on the control substrate 120, and the like. Also, an opening 110 for guiding incident light to reach the image pickup element 130 is provided in a chassis 102 of the image pickup unit 100. The blade installed in the shutter unit 1 adjusts the opening rate of the opening 11, thereby allowing the amount of the incident light to reach the image pickup element 130 to be adjusted. Additionally, a lens (not illustrated) is arranged in the optical axis within the image pickup unit 100. The chassis 102 of the image pickup unit 100 is formed in a rectangular tubular shape. The imaging device has a rectangular parallelepiped shape, as illustrated in FIGS. 1 and 2.

As illustrated in FIGS. 1 to 3, the shutter unit 1 has terminal portions 80L and 8OR extending outward from the chassis 2 in the optical axis direction. The terminal portions 80L and 80R extends outward from corner portions on the diagonal line of the bottom surface, having a substantially rectangular shape, of the chassis 2. The terminal portions 80L and 80R each has a thin plate shape made of electrically conductive materials.

The terminal portion 80L has a hole 81L. Further, the terminal portion 80L has a bending portion 82L at its end. The bending portion 82 has an L shape when viewed from side thereof. The bending portion 82L faces outward from the image pickup unit 100. Like the terminal portion 80L, the terminal portion 80R is arranged. The terminal portions 80L and 80R are electrically connected to a coil (not illustrated) of an actuator (not illustrated) serving as a drive source for driving the blade installed within the shutter unit 1.

The image pickup unit 100 is provided with recess portions 180L and 180R arranged at positions corresponding to the terminal portions 80L and 80R, respectively. That is, the recess portions 180L and 180R are formed at corner portions on the diagonal line of the image pickup unit 100. The recess portion 180L is provided with a projection portion 181L at its substantially center portion in the optical axis direction. The projection portion 181L and the hole portion 81L are engaged with each other, when the shutter unit 1 is assembled into the image pickup unit 100. The projection portion 181L and the hole portion 81L correspond to alignment means for positioning the terminal portion 80L and the image pickup unit 100. Therefore, the shutter unit 1 and the image pickup unit 100 are aligned with each other. This also applies to the recess portion 180R and the terminal portion 80R.

As illustrated in FIGS. 1 and 2, the bending portion 82L and an upper surface of the control substrate 120 are abutted, after the shutter unit 1 is assembled into the image pickup unit 100. The control substrate 120 is provided with a pattern for electrically connecting with the terminal portion 80L at its portion which abuts the bending portion 82L. Further, an IC (not illustrated) for controlling the operation of the actuator, which drives the blade installed into the shutter unit 1, is mounted on the control substrate 120. Therefore, the IC and the bending portion 82L are electrically connected via the pattern formed on the control substrate 120. This arrangement also applies to the terminal portion 80R. Consequently, the operation of the actuator is controlled by the IC.

In this manner, the control substrate 120 and the coil of the actuator are electrically connected via the terminal portions 80L and 80R. Further, the shutter unit 1 and the image pickup unit 100 are aligned by engagement of the projection portion 181L with the hole portion 81L. Therefore, this eliminates a conventional work such as soldering for ensuring the electrical connection between the FPC and the control substrate 120, thereby improving the assembling workability. In addition, the terminal portions 80L and 80R ensure the electrical connection between the actuator and the control substrate 120 and aligns the shutter unit 1 and the image pickup unit 100 with each other, thereby consolidating the functions into the terminal portions 80L and 80R. This suppresses an increase in the number of the parts and the complicated structure.

The recess portions 180L and 180R respectively receives the terminal portions 80L and 80R, and the imaging device is formed in a rectangular shape when viewed in the optical axis direction. This suppresses an increase in the size of the imaging device, which is caused by the terminal portions 80L and 80R greatly extending outward from the chassis 102 of the image pickup unit 100.

Figure 4:
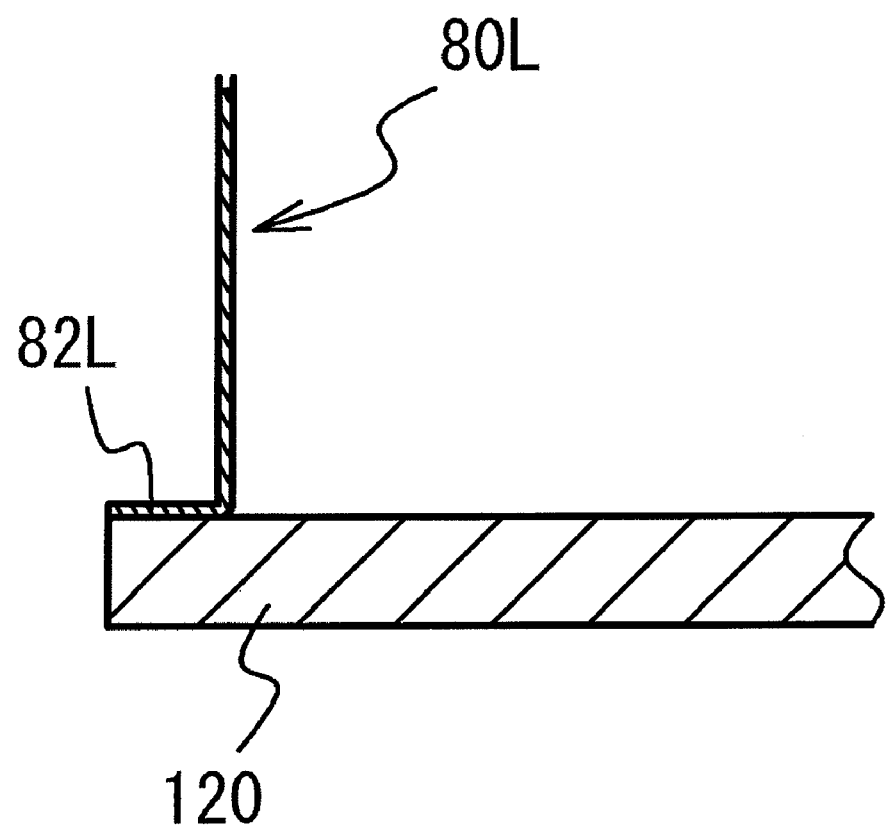
FIG. 4 is an explanatory view of a bending portion.

Next, a description will be given of the bending portion 82L of the terminal portion 80L. FIG. 4 is an explanatory view of the bending portion 82L. FIG. 4 is a schematic view of the terminal portion 80L and the control substrate 120 when viewed from their sides. Additionally, the chassis 102 and the likes are omitted. As illustrated in FIG. 4, the bending portion 82L has a side surface with a substantially L shape. Thus, the abutment area of the control substrate 120 with the terminal portion 80L is ensured. Accordingly, the electrical connection of the control substrate 120 and the terminal portion 80L can be ensured.

Figures 5A, 5B:
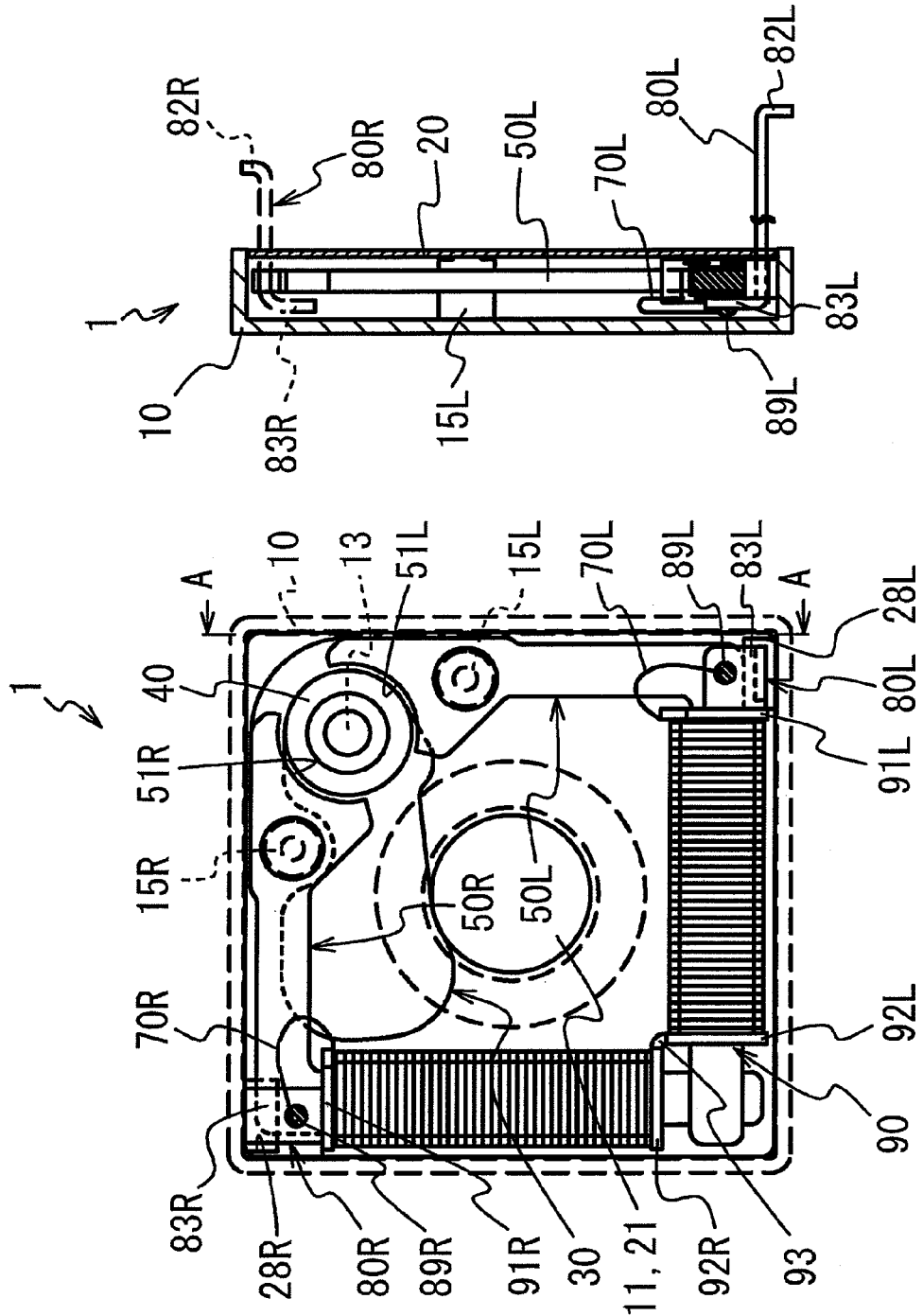
FIG. 5A is a front view of an inner structure of the shutter unit.
FIG. 5B is a cross-sectional view taken along line A-A of FIG. 5A.

Further, the terminal portion 80L is designed to be elastically deformable, the terminal portion 80L is slightly longer than an actual height of the chassis 102 in the optical axis direction so as to be in pressure contact with the control substrate 120 by the elastic restoring force of the terminal portion 80L. Additionally, this arrangement applies to the terminal portion 80R. This stably retains the electrically connected state between the terminal portions 80L and 80R and the control substrate 120, and eliminates working processes such as soldering and applying of a conductive material and the like, after the shutter unit 1 is assembled into the image pickup unit 100, Next, a description will be given of the shutter unit 1 in more detail. FIG. 5A is a front view of an inner structure of the shutter unit 1, and FIG. 5B is a cross-sectional view taken along line A-A of FIG. 5A. As illustrated in FIGS. 5A and 5B, the shutter unit 1 includes: a first case 10; a second case 20; a blade 30; a rotor 40; iron pieces 50L and 5OR; coils 70L and 70R; and terminal portions 80L and 80R. In addition, the first case 10 is illustrated by a broken line in FIG. 5A.

The chassis 2 is composed of the first and second cases 10 and 20 so as to house the blade 30, the rotor 40, the iron pieces 50L and 50R, and parts of the terminal portions 80L and 80R as illustrated FIGS. 5A and 5B. The first and second cases 10 and 20 are made of synthetic resins, and the first case 10 is thicker than the second case 20. The shutter unit 1 is fixed on the image pickup unit 100 with the first and second cases 10 and 20 respectively facing the object side and the image pickup unit 100 side. The first and second cases 10 and 20 respectively have the openings 11 and 21. Additionally, the first case 10 is illustrated by a broken line in FIG. 1.

The blade 30 is made of a synthetic resin, and is supported to open and close the openings 11 and 21. The blade 30 swings in conjunction with the rotor 40. In FIG. 5A, the blade 30 is receded from the openings 11 and 21, and the openings 11 and 21 are in a fully opened state.

The rotor 40 is energized with different polarities in the circumferential direction, and is rotatably supported within the first and second cases 10 and 20. More specifically, the rotor 40 is slidably engaged on a fixed shaft 13 formed within the first and second cases 10 and 20.

As illustrated in FIG. 5A, the iron pieces 50L and 5OR are arranged along the inner surfaces of the first and second cases 10 and 20, and also surround a substantially entire periphery of the openings 11 and 21 except for the rotor 40. The rotor 40 is arranged at a corner portion of the shutter unit 1 when viewed form its front side, as illustrated in FIG. 5A. The iron pieces 50L and 50R are connected to partially overlap each other at the corner portion, on the diagonal line, where the rotor 40 is arranged. The iron pieces 50L and 50R each has a substantial L shape. The iron pieces 50L and 50R respectively have magnetic pole portions 51L and 51R at their portions facing the rotor 40. The iron pieces 50L and 50R are fixed by fixing pins 15L and 15R formed on the first case 10.

The iron pieces 50L and 50R are assembled into a coil bobbin 90. The coil bobbin 90 is made of a synthetic resin. Referring to FIG. 5A, the coil bobbin 90 includes: two arm portions around which the coils 70L and 70R are wound; flange portions 91L and 92L respectively formed at both ends of one of the arm portions; and flange portions 91R and 92R respectively formed at both ends of the other of the arm portions. Herein, the coils 70L and 70R are composed of a single wire.

The coils 70L and 70R are respectively provided for exciting the iron pieces 50L and 50R. By energizing the coils 70L and 70R, the magnetic pole portions 51L and 51R are excited to have different polarities to apply a rotational force to the rotor 40. That is, the entire iron pieces 50L and 50R serve as a stator for applying the rotational force to the rotor 40. Thus, the rotor 40, the iron pieces 50L and 50R, the coils 70L and 70R, and the coil bobbin 90 serve as an actuator which is a drive source for driving the blade 30.

The coil bobbin 90 has a thin portion 93 connecting the flange portions 92L and 92R. The thin portion 93 is made thinner than any other portion such as the flange portion 92L, and is also made bendable. The coil bobbin 90 is bent via the thin portion 93 such that the flange portions 92L and 92R are perpendicular to each other, as illustrated in FIG. 5A.

As illustrated in FIGS. 5A and 5B, the flange portions 91L and 91R of the coil bobbin 90 are integrally formed with the terminal portions 80L and 80R, respectively, by insert molding. The terminal portions 80L and 80R extend outward from the first and second cases 10 and 20 through receiving holes 28L and 28R formed at corner portions of the second case 20. Additionally, the terminal portions 80L and 80R are respectively provided with attachment portions 83L and 83R at one ends opposite the other ends at which the bending portions 82L and 82R are provided. The attachment portions 83L and 83R are electrically connected to ends of the coils 70L and 70R with solder portions 89L and 89R, respectively. This achieves the electrical connection of the coils 70L and 70R with the terminal portions 80L and 80R.

Figures 6A, 6B:
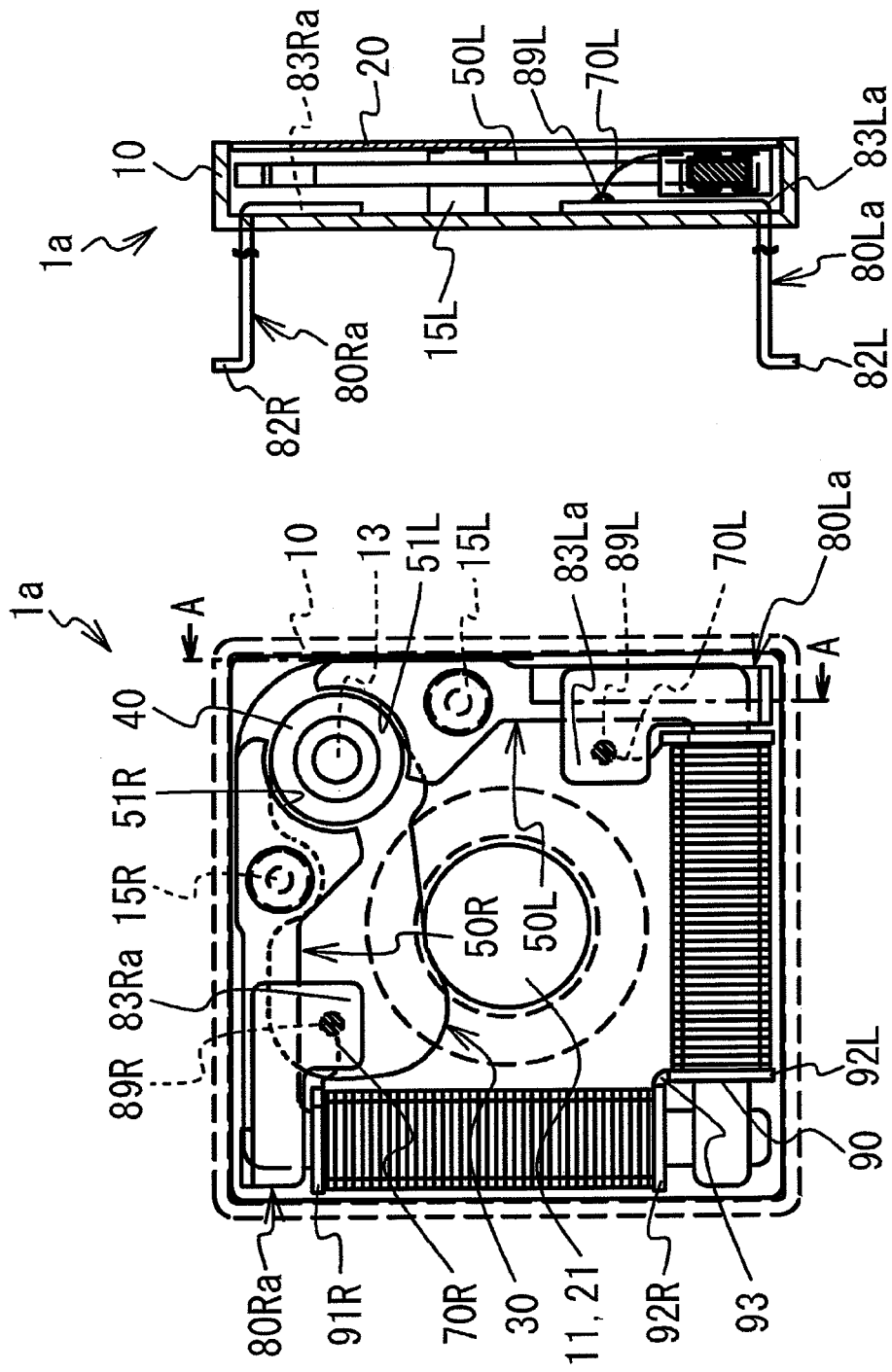
FIG. 6A is a front view of an inner structure of a shutter unit of the imaging device according to a first variation.
FIG. 6B is a cross-sectional view taken along line A-A of FIG. 6A.

Next, a description will be given of an imaging device according to a first variation with reference to drawings. Further, in the imaging device according to the first variation, like elements are referenced using like numbers to omit duplication description. FIG. 6A is a front view of an inner structure of a shutter unit 1a of the imaging device according to the first variation, and FIG. 6B is a cross-sectional view taken along line A-A of FIG. 6A.

As illustrated in FIG. 6B, terminal portions 80La and 80Ra extend from the first and second cases 10 and 20 to the first case 10 side. Additionally, the first case 10 is formed with holes, not illustrated, for receiving the terminal portions 80La and 80Ra. Unlike the shutter unit 1 according to the first embodiment, in the shutter unit 1a, the first case 10 is attached to face the image pickup unit 100 side, and the second case 20 is attached to face the object side.

The terminal portions 80La and 80Ra are fixed on the inner wall surface of the first case 10 at the attachment portions 83La and 83Ra, respectively, with adhesion bonding, double faced-tapes or the like. An adhesive area of the attachment portions 83La and 83Ra are larger than that of the attachment portions 83L and 83R as mentioned above. Moreover, the attachment portions 83La and 83Ra do not come into contact with the iron pieces 50L and 50R. In addition, one ends of the coils 70L and 70R are electrically connected to rear surfaces of the attachment portions 83La and 83Ra by the solder portions 89L and 89R, respectively, the rear surfaces being opposite surfaces, of the attachment portions 83La and 83Ra, fixed on the inner side wall of the first case 10. These arrangements also achieve the electrical connection of the coils 70L and 70R with the terminal portions 80La and 80Ra.

Figure 7A:
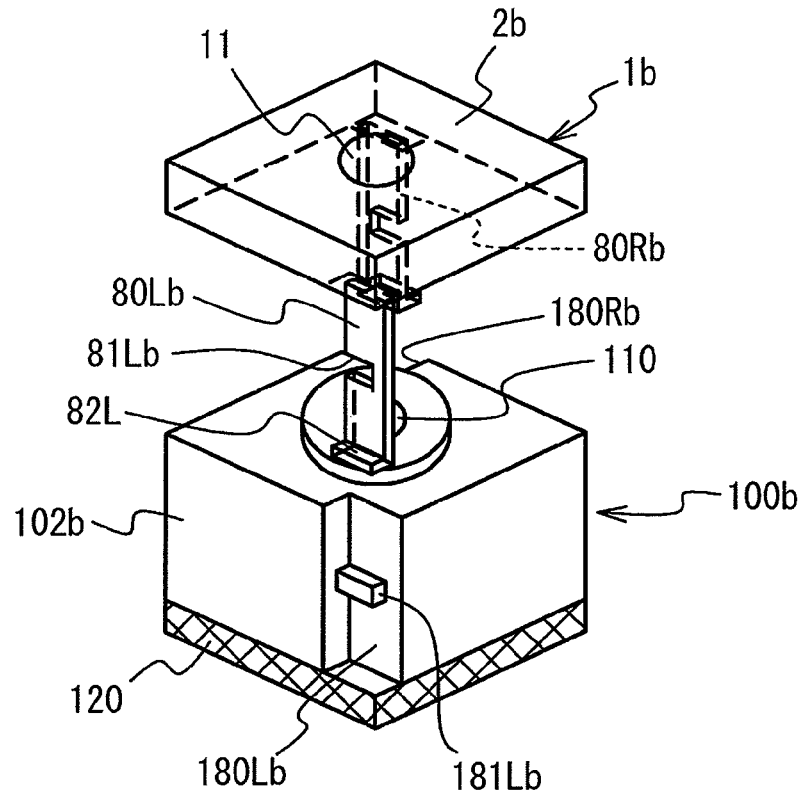
FIG. 7A is a perspective view of an imaging device according to a second variation in a state in which a shutter unit and an image pickup unit are separated.

Next, a description will be given of an imaging device according to a second variation. FIG. 7A is a perspective view of the imaging device according to the second variation in a state in which a shutter unit 1b and an image pickup unit 100b are separated. A terminal portion 80Lb has a cutout portion 81Lb with a substantially rectangular shape. Further, a recess portion 180Lb is provided with a projection portion 181Lb having a rectangular parallelepiped shape corresponding to the shape of the cutout portion 81Lb. These arrangements also align the shutter unit 1b and the image pickup unit 100b with each other.

Figure 7B:
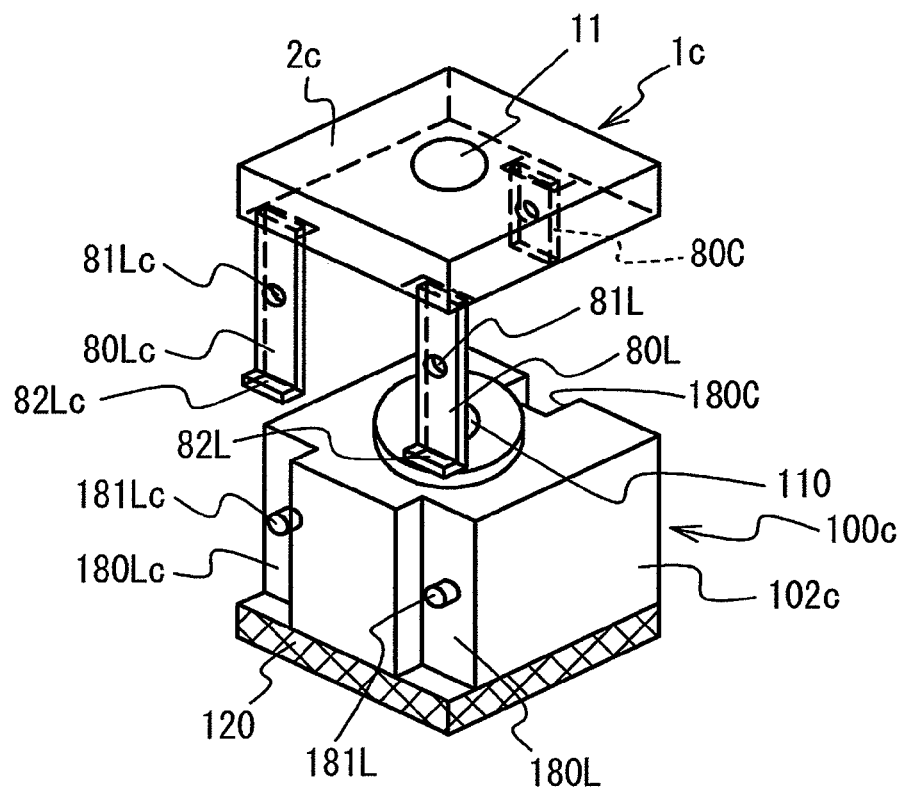
FIG. 7B is a perspective view of an imaging device according to a third variation in a state in which a shutter unit and an image pickup unit are separated.

Next, a description will be given of an imaging device according to a third variation. FIG. 7B is a perspective view of an imaging device according to the third variation in a state in which a shutter unit 1c and an image pickup unit 100c are separated. As illustrated in FIG. 7B, the shutter unit 1c is provided with three terminal portions 80L, 80Lc, and 80C. The terminal portions 80L and 80Lc are respectively arranged at both ends of one side of the shutter unit 1c. The terminal portion 80Lc has a hole portion 81Lc and a bending portion 82Lc, and the same configuration of the terminal portion 80L applies to the terminal portion 80Lc. Further, the terminal portion 80C is arranged at a substantially central portion of a side opposite to the above mentioned one side. A chassis 102c of the image pickup unit 100c is provided with recess portions 180L, 180Lc, and 180C at corresponding positions.

The terminal portion 80c is also provided with a hole portion, serving as alignment means, although its reference number is omitted. Additionally, the terminal portion 80C is shorter than the terminal portion 80L or 80Lc in the optical axis direction. Therefore, an end portion of the terminal portion 80C dose not come into contact with the upper surface of the control substrate 120, after the shutter unit 1c is assembled on the image pickup unit 100. Thus, the terminal portion 80C corresponds to alignment means for aligning the image pickup unit 100 and the shutter unit 1c with each other, and dose not electrically connect the actuator installed into the shutter unit 1c with the control substrate 120.

The recess portions 180L and 180Lc each are electrically connected to the coil of the actuator installed into the shutter unit 1c. The recess portions 180L and 180Lc abuts the upper surface of the control substrate 120, so that the actuator and the control substrate 120 are electrically connected to each other.

Figure 8A:
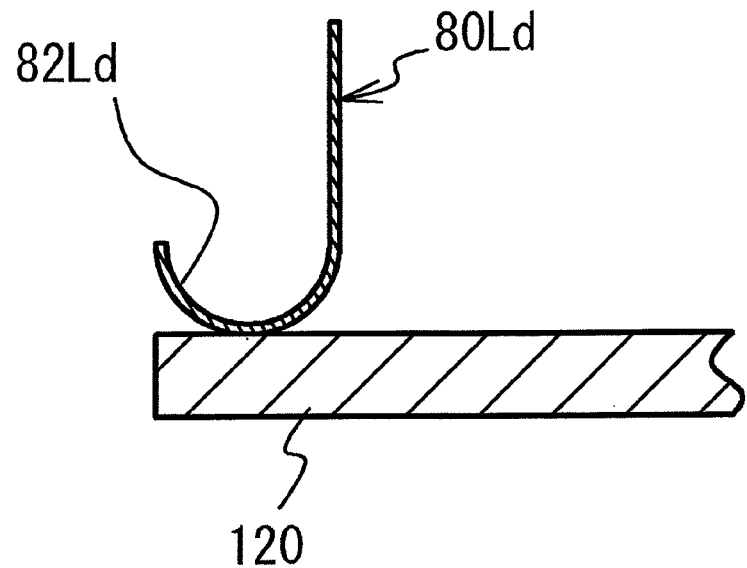
FIG. 8A is a view of a bending portion of an imaging device according to a fourth variation.

Next, a description will be given of an imaging device according to a fourth variation. FIG. 8A is a view of a bending portion 82Ld of the imaging device according to the fourth variation. As illustrated in FIG. 8A, the bending portion 82Ld has a curved shape like a letter "J", when viewed from its side. Even if such a shape may be employed, the shutter unit and the image pickup unit can be held with a terminal portion 80Ld and the control substrate 120 being in contact with each other. Further, after the assembling of the imaging device is accomplished, as with the imaging device mentioned above, the terminal portion 80Ld is slightly longer than the chassis of the image pickup unit in the optical axis direction. Furthermore, the terminal portion 80Ld has an elastic restoring force to bring into pressure contact with the control substrate 120, because the terminal portion 80Ld is elastic.

Figure 8B:
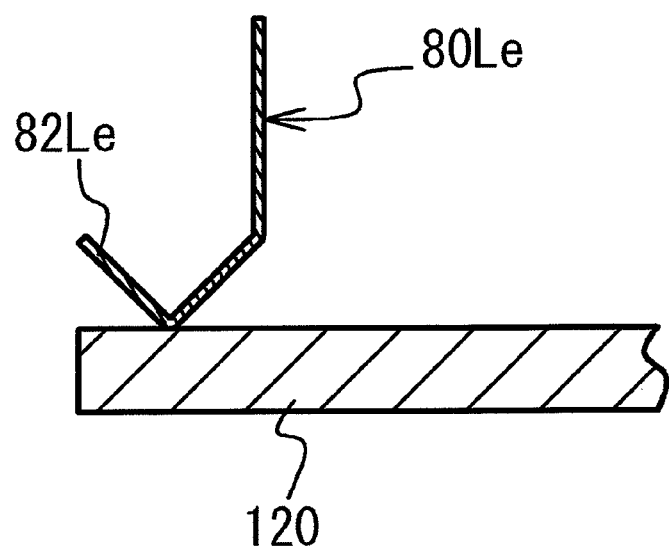
FIG. 8B is a view of a bending portion of an imaging device according to a fifth variation.
Figure 10A:
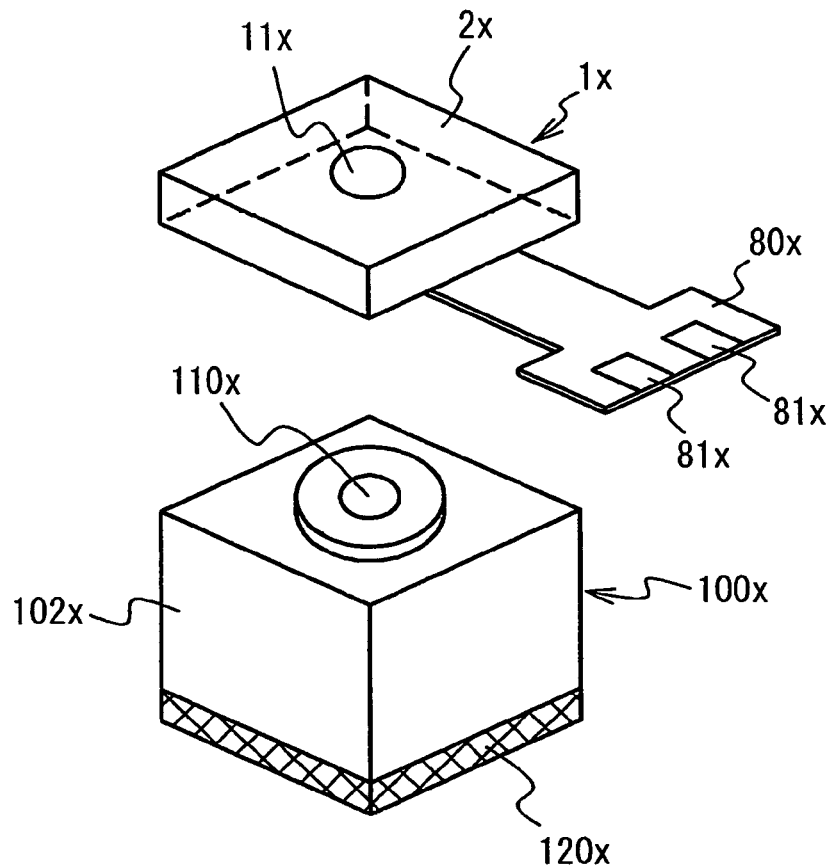
FIG. 10A is an exploded perspective view of a conventional imaging device.
Figure 10B:
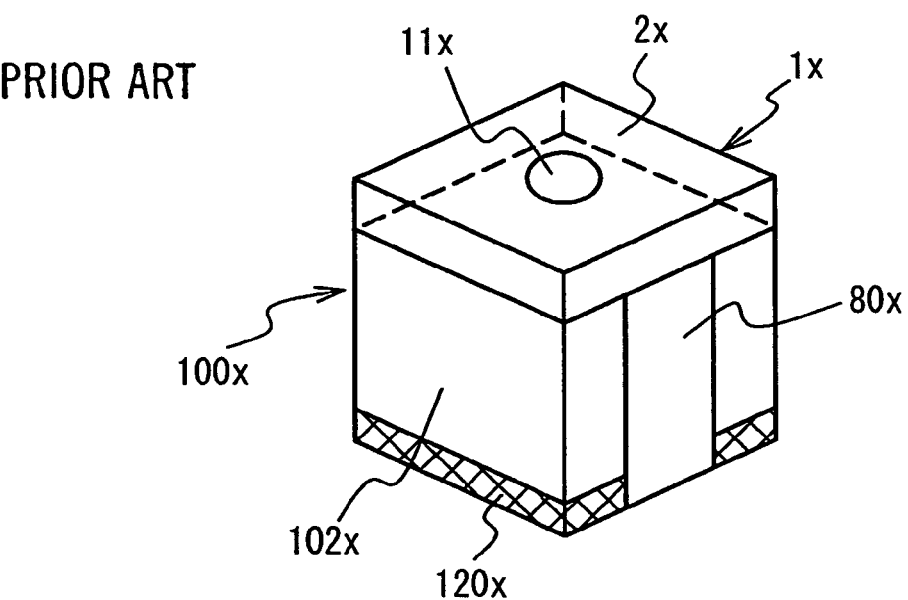
FIG. 10B is a perspective view of the conventional imaging device after a chassis is assembled to the image pickup unit.

Next, a description will be given of an imaging device according to a fifth variation. FIG. 8B is a view of a bending portion 82Le of the imaging device according to the fifth variation. Referring to FIG. 8B, the bending portion 82Le has plural bending portions. This configuration also develops the same effect as with the bending portion 82Ld according to the fourth variation.

Next, a description will be given of an imaging device according to a sixth variation. FIG. 9A is a front view of an inner structure of a shutter unit if of an imaging device according to the sixth variation, and FIG. 9B is a cross sectional view taken along line A-A of FIG. 9A.

As illustrated in FIG. 9A, the shutter unit 1f includes iron pieces 50f, 60Lf, and 60Rf, and an interconnecting portion 80M. The iron pieces 50f, 60Lf, and 60Rf are connected to each other. The iron piece 50f has a substantially lateral U-shape, as illustrated in FIG. 9A. The iron pieces 60Lf and 60Rf each are connected to end portions of the iron piece 50. The iron pieces 50f, 60Lf, and 60Rf are fixed within the first and second cases 10 and 20 by the fixing pins 15L, 15R, 16L, and 16R. The iron pieces 60L and 60R are formed with magnetic pole portions 61Lf and 61Rf, respectively, facing the rotor 40. The iron pieces 50f, 60Lf, and 60Rf serve as a stator. Coils 70Rf and 70Lf are wound respectively around opposed arm portions of the iron piece 50.

One end of the coil 70Rf is electrically connected to the terminal portion 80Rf, and the other end of the coil 70Rf is electrically connected to the interconnecting portion 80M, with the solder portions 89R. Similarly, one end of the coil 70Lf is electrically connected to a terminal portion 80Lf, and the other end of the coil 70Lf is electrically connected to the interconnecting portion 80M, with the solder portions 89L. The interconnecting portion 80M has a plate shape made of a metallic material with the same conductivity with those of the terminal portions 80Lf and 80Rf. The terminal portions 80Rf and 80Lf, and the interconnecting portion 80M are fixed on an inner wall surface of the first case 10 with adhesive bonding or double-faced tapes. For example, current flows from the terminal portion 80Lf to the coil 70Lf, then flows across the coil 70Rf via the interconnecting portion 80M, and reaches at the terminal portion 80Rf. In this manner, the interconnecting portion 80M serves for electrically connecting two coils 70Lf and 70Rf to each other.

The present invention is not limited to the above-mentioned embodiment, and other embodiments, variations and modifications may be made without departing from the scope of the present invention.

The above embodiment exemplifies the second case made of a synthetic resin. However, the second case may be made of a metallic plate.

The embodiment illustrated in FIGS. 9A and 9B exemplifies the terminal portions 80Rf, 80Lf, and the interconnecting portion 80M fixed on the inner wall surface of the first case 10 with adhesive bonding or double-faced tapes. However, these parts are integrally formed with the first case 10 by insert molding.

The alignment means may correspond to a projecting portion formed in the terminal portion and a hole portion or a cutout portion formed in the image pickup unit engaging the projecting portion.

Finally, several aspects of the present invention are summarized as follows.

According to an aspect of the present invention, there is provided an imaging device including: an image pickup unit including an image pickup element and a control substrate mounted with the image pickup element; and a shutter unit including a blade for adjusting an amount of light reaching the image pickup element and a drive source for driving the blade; wherein the shutter unit includes a terminal portion electrically connected to a coil of the drive source, the terminal portion extends outward from the shutter unit and is electrically connected to the control substrate, the terminal portion and the image pickup unit include alignment means for aligning these each other, and the shutter unit is aligned with the image pickup unit via the terminal portion.

With such a configuration, the coil of the drive source and the control substrate are electrically connected via the terminal portion, and the shutter unit and the image pickup unit are aligned. Therefore, a conventional work such as soldering can be eliminated, therefore, providing an imaging device having an improved assembling workability. Further, since functions can be consolidated to the terminal portion, a complicated structure can be suppressed.

In the above configuration, the terminal portion may be in pressure contact with the control substrate by an elastic restoring force of the terminal portion. This configuration allows the electrical connection of the terminal portion and the control substrate with stability. This also eliminates a working process such as soldering or applying of a conductive material.

In the above configuration, the image pickup unit may have a recess portion for receiving the terminal portion. With such a configuration, the increase in the size of the imaging device due to the terminal portion extending outward can be suppressed.

In the above configuration, the imaging device may be formed in a rectangular shape when viewed in an optical axis direction. This configuration can also suppress the imaging device from being increased in its size.

In the above configuration, the terminal portion may extend from a corner portion of the shutter unit having a rectangular shape. With such a configuration, a space in the imaging device can be effectively used.

In the above configuration, the alignment means may include: a hole formed in one of the terminal portion and the image pickup unit; and a projection portion formed in the other of the terminal portion and the image pickup unit to engage the hole. With such a configuration, the complicated structure of the imaging device can be suppressed and its assembling property can be improved.

In the above configuration, the alignment means may include: a cutout portion formed in one of the terminal portion and the image pickup unit; and an projection portion formed in the other of the terminal portion and the image pickup unit to engage the cutout portion. This configuration also suppresses the complicated structure of the imaging device and improves the assembling property.

What is claimed is:

1. An imaging device comprising:

an image pickup unit including an image pickup element and a control substrate mounted with the image pickup element; and a shutter unit including a blade for adjusting an amount of light reaching the image pickup element and a drive source for driving the blade, wherein:

the shutter unit includes a terminal portion electrically connected to a coil of the drive source, the terminal portion extends outward from the shutter unit and is electrically connected to the control substrate;

the terminal portion and the image pickup unit include alignment means for aligning these each other; and the shutter unit is aligned with the image pickup unit via the terminal portion.

2. The imaging device of claim 1, wherein the terminal portion is in pressure contact with the control substrate by an elastic restoring force of the terminal portion.

3. The imaging device of claim 1, wherein the image pickup unit has a recess portion for receiving the terminal portion.

4. The imaging device of claim 1, wherein the imaging device is formed in a rectangular shape when viewed in an optical axis direction.

5. The imaging device of claim 1, wherein the terminal portion extends from a corner portion of the shutter unit having a rectangular shape.

6. The imaging device of claim 1, wherein the alignment means includes: a hole formed in one of the terminal portion and the image pickup unit; and a projection portion formed in the other of the terminal portion and the image pickup unit to engage the hole.

7. The imaging device of claim 1, wherein the alignment means includes: a cutout portion formed in one of the terminal portion and the image pickup unit; and an projection portion formed in the other of the terminal portion and the image pickup unit to engage with the cutout portion.

* * * * *